(12) United States Patent
Watanabe

(10) Patent No.: US 11,989,714 B2
(45) Date of Patent: May 21, 2024

(54) WIRELESS TAG READING DEVICE

(71) Applicant: TOSHIBA TEC KABUSHIKI KAISHA, Tokyo (JP)

(72) Inventor: Osamu Watanabe, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 224 days.

(21) Appl. No.: 17/715,072

(22) Filed: Apr. 7, 2022

(65) Prior Publication Data

US 2023/0012478 A1  Jan. 19, 2023

(30) Foreign Application Priority Data

Jul. 16, 2021  (JP) .................... 2021-117583

(51) Int. Cl.
*G06Q 20/20* (2012.01)
*G06K 7/10* (2006.01)

(52) U.S. Cl.
CPC ....... *G06Q 20/208* (2013.01); *G06K 7/10316* (2013.01)

(58) Field of Classification Search
CPC ............ G06Q 20/208; G06K 7/10316; G06K 7/10415; G07G 1/0018; G07G 1/009; H01Q 1/2216; H01Q 3/02
See application file for complete search history.

(56) References Cited

U.S. PATENT DOCUMENTS

2018/0053022 A1\* 2/2018 Murofushi ......... G06K 7/10009
2019/0335346 A1\* 10/2019 Abadie ................ H04B 17/345

\* cited by examiner

*Primary Examiner* — A. Hunter Wilder
(74) *Attorney, Agent, or Firm* — Amin, Turocy & Watson, LLP

(57) ABSTRACT

According to one embodiment, a wireless tag reading device includes a product placing portion on which a product is placed, an antenna which is installed in a vicinity of the product placing portion and emits radio waves toward a wireless tag attached to the placed product, and an antenna moving mechanism for moving the antenna along a locus of a concave curve.

20 Claims, 7 Drawing Sheets

WIRELESS TAG READING DEVICE

CROSS-REFERENCE TO RELATED APPLICATION

This application is based upon and claims the benefit of priority from Japanese Patent Application No. 2021-117583, filed on Jul. 16, 2021, the entire contents of which are incorporated herein by reference.

FIELD

Embodiments described herein relate generally to a wireless tag reading device, a tag reading method, and a POS terminal.

BACKGROUND

Recently, a POS terminal which reads a wireless tag attached to a product if a customer places a basket storing the product to be purchased at a checkout position, and performs product registration processing and settlement processing in response to an operation of a clerk or the customer has become widespread in a store such as a mass retailer, a convenience store, and a clothing store.

Such a POS terminal has the following problems in reading the wireless tag. That is, if there is a shielding object (for example, metal or water droplets), which does not allow radio waves to pass or is difficult to allow radio waves to pass, between the wireless tag and the antenna which reads the wireless tag, there is a problem that, for example, radio waves emitted from the antenna do not reach the wireless tag, and the radio waves (tag information) transmitted from the wireless tag do not reach the antenna.

DETAILED DESCRIPTION

An aspect of an exemplary embodiment is to provide a wireless tag reading device which makes it easy for radio waves emitted from an antenna to reach a wireless tag.

In general, according to one embodiment, a wireless tag reading device of an embodiment includes a product placing portion on which a product is placed, an antenna which is installed in a vicinity of the product placing portion and emits radio waves toward a wireless tag attached to the placed product, and an antenna moving mechanism for moving the antenna along a locus of a concave curve.

Hereinafter, an embodiment will be described with reference to the drawings. In the embodiment, for example, a POS terminal installed in a store such as a supermarket, a home center, a clothing store, or a convenience store will be described as a wireless tag reading device. Exemplary embodiments are not limited to the embodiment described below.

A customer receives a basket for storing products at the entrance of a store. The customer puts (stores products in the basket) products to be purchased in the basket in the store. All products in the store are tagged with wireless tags (for example, radio frequency identification (RFID) tags). The wireless tag reading device is operated by the customer himself or herself or an operator such as a store clerk. If the customer places the basket storing the products on a product placing portion and operates a start key, the wireless tag reading device emits radio waves from an antenna to a wireless tag attached to the product stored in the basket, and then the wireless tag reading device receives a response wave (radio wave) containing information for identifying the product from the wireless tag and acquires a product code (product specifying information for specifying the product).

The wireless tag reading device is a device which performs product registration processing related to the product and settlement processing related to the transaction based on the acquired product code.

The product registration processing includes processing of calling product information such as the product name and price of the product based on the acquired product code from a product master, displaying the product information on a display unit, and storing the product information in a product information portion for the product to be purchased. The settlement processing is to display the total amount and change amount (hereinafter referred to as "settlement information") related to the transaction with the customer based on the product information of the product that is subjected to registration processing and make settlement using a credit card or an application installed in a mobile terminal, for example. The settlement processing includes processing of issuing a receipt printed with the product information and settlement information of a settled product 42.

Figure 1:
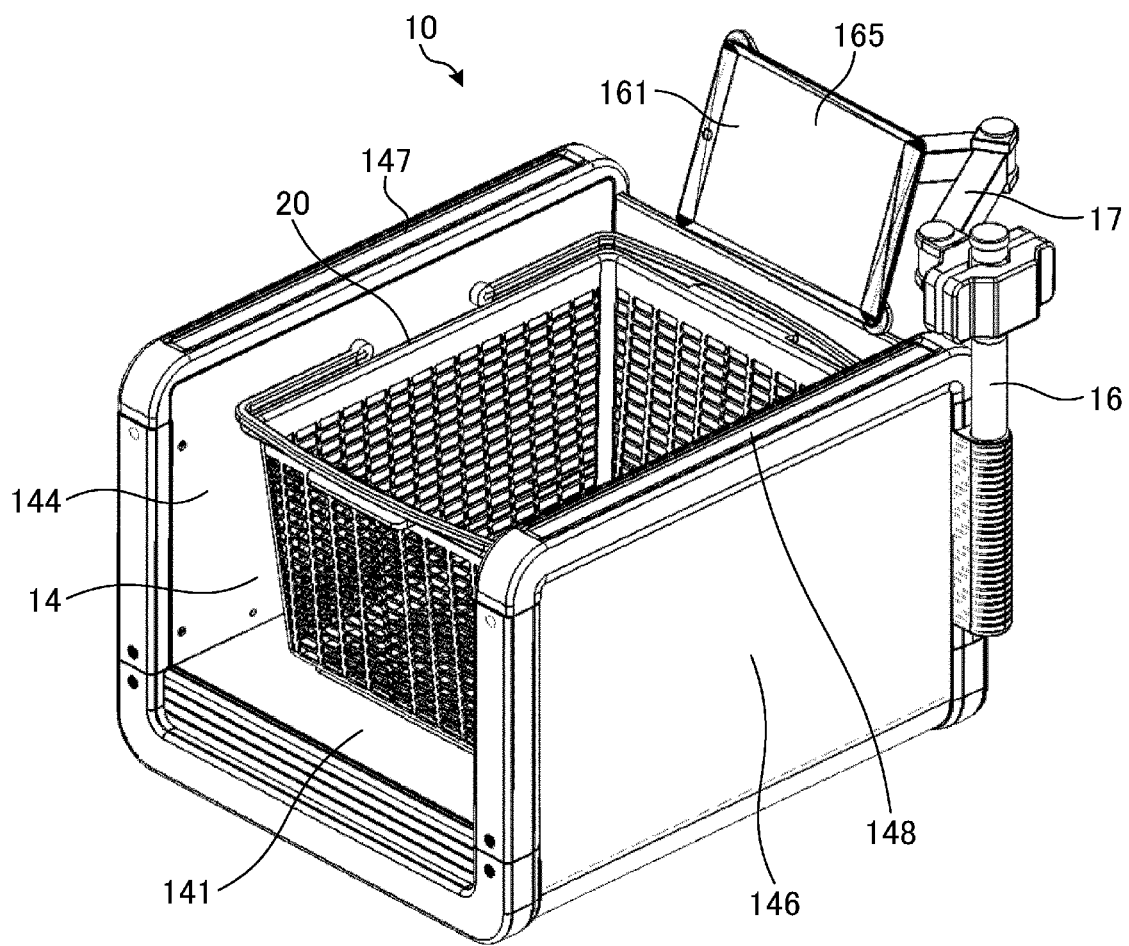
FIG. 1 is a perspective view of a wireless tag reading device according to an embodiment.
Figure 2:
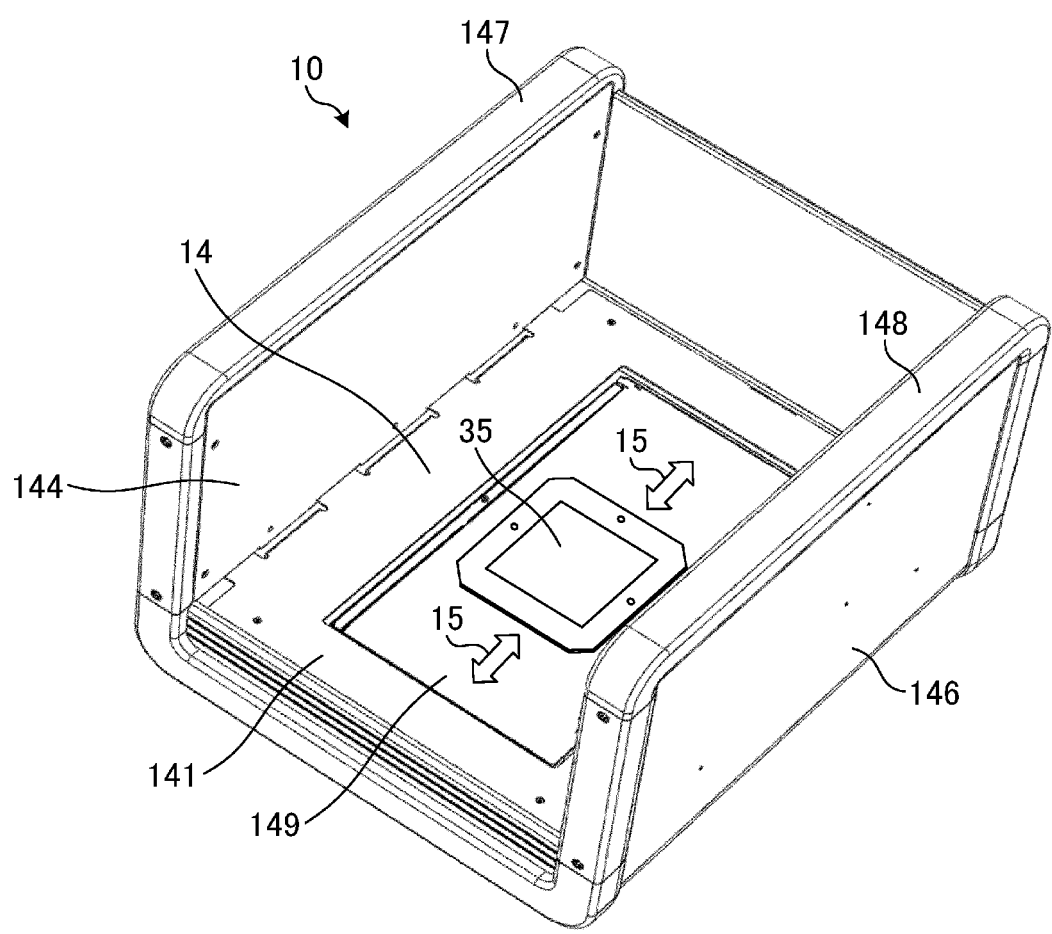
FIG. 2 is a perspective view illustrating the vicinity of a product placing portion of the wireless tag reading device.

FIG. 1 is a perspective view of a wireless tag reading device according to the embodiment. Further, FIG. 2 is a perspective view illustrating the vicinity of a product placing portion of the wireless tag reading device. As illustrated in FIG. 1, a wireless tag reading device 10 includes a product placing portion 14. The product placing portion 14 is a table on which a basket 20 storing the product 42 (see FIG. 5) to be purchased is placed. FIG. 1 illustrates a state in which the basket 20 is placed on the product placing portion 14. The product placing portion 14 includes a bottom surface portion 141, a left side surface portion 144, and a right side surface portion 146. The bottom surface portion 141 is a substantially flat surface forming the bottom surface of the product placing portion 14. The basket 20 is placed on the bottom surface portion 141.

The left side surface portion 144 is a surface forming the left side surface of the product placing portion 14. The left side surface portion 144 is erected at a substantially right angle from the left end portion of the bottom surface portion 141. A light emitting portion 147 is provided at the upper end portion of the left side surface portion 144. The light emitting portion 147 is composed of, for example, a light emitting diode (LED) and emits light rays upward. The light emitting portion 147 lights up in blue if the information of all the wireless tags 43 (see FIG. 5) is read. If it is failed to read the information of the wireless tags 43, the light emitting portion 147 lights up in red.

The right side surface portion 146 is a surface forming the right side surface of the product placing portion 14. The right side surface portion 146 is erected at a substantially right angle from the right end portion of the bottom surface portion 141. A light emitting portion 148 is provided at the upper end portion of the right side surface portion 146. The light emitting portion 148 is composed of, for example, an LED and emits light rays upward. The light emitting portion 148 lights up in blue if the information of all the wireless tags 43 is read. If it is failed to read the information of the wireless tags 43, the light emitting portion 148 lights up in red.

A support column 16 extending upward is attached to the rear of the product placing portion 14. An arm 17 which can be expanded and contracted and whose direction can be freely changed is attached to the support column 16. A display unit 161 is attached to the tip of the arm 17. The display unit 161 can freely change the display position and the display direction by deforming the arm 17. The display unit 161 displays the product information of the product 42 (the product stored in the basket 20 placed in the product placing portion 14) to be purchased by the customer, for example, based on the information received from the wireless tag 43. Further, the display unit 161 displays images corresponding to various keys (a start key 1651, an end key 1652, a confirmation key 1653 (all of which see FIG. 6)) described below.

An operation unit 165 is, for example, a touch panel provided on the display unit 161. By operating the touch panel at the position corresponding to the image of the key displayed on the display unit 161, the operation unit 165 plays the role of the key.

As illustrated in FIG. 2, an opening portion 149 is provided in the central portion of the bottom surface portion 141. The opening portion 149 is a substantially rectangular hole formed in the bottom surface portion 141. The wireless tag reading device 10 is provided with an antenna 35 and an antenna moving mechanism 30 below the bottom surface portion 141 and at a position corresponding to the opening portion 149. The antenna moving mechanism 30 is not illustrated in FIG. 2 because it will be described with reference to FIGS. 3 to 5, but in FIG. 2, the antenna moving mechanism 30 is provided below the antenna 35. In FIG. 2, the antenna 35 is located at a home position 156, which is usually the central portion, and can reciprocate in the directions of an arrow 157 and an arrow 158.

In addition, in FIG. 2, the opening portion 149 is described in order to disclose the antenna 35. However, the opening portion 149 is a theoretical opening for explaining the position of the antenna 35. Actually, the opening portion 149 is closed with a plate-shaped member through which radio waves can pass so that the product 42 does not fall from the opening portion 149 (the same applies to FIG. 5). Alternatively, the opening portion 149 is not actually formed.

Figure 3:
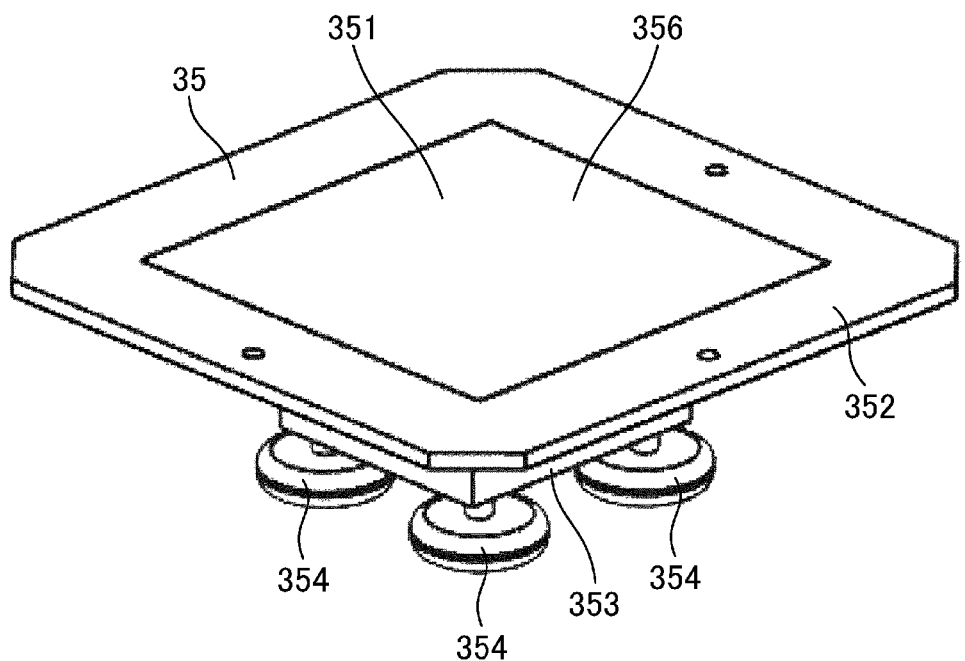
FIG. 3 is a perspective view illustrating an antenna.

Next, the antenna 35 will be described. FIG. 3 is a perspective view illustrating the antenna 35. As illustrated in FIG. 3, the antenna 35 has an antenna portion 351, a substrate portion 352, a base portion 353, a roller 354, and a guide rod 355 described below (see FIG. 5).

The antenna portion 351 has, for example, a surface 356 with a substantially planar shape in which a linear metal antenna wire (not illustrated) is arranged in a spiral shape. Further, the substrate portion 352 is a circuit board for emitting radio waves from the antenna unit 351 and reading radio waves received from the wireless tag 43. The antenna 35 transmits the radio wave generated by the substrate portion 352 in the direction perpendicular to the surface 356 of the antenna portion 351. Further, the antenna 35 also transmits the radio waves generated by the substrate portion 352 radially from the surface 356 forming the antenna portion 351. The radio wave transmitted from the antenna portion 351 has a stronger radio wave strength as the radio wave transmitted at a right angle from the surface 356. Further, the antenna 35 receives the radio wave transmitted from the wireless tag 43 by the antenna unit 351.

Further, the antenna 35 has a base portion 353, and four rotatable rollers 354 are attached to the base portion 353. The roller 354 engages with a rail 33 (see FIG. 4) having a groove shape and described below, and the roller 354 rotates in the rail 33 to guide the antenna 35.

Figure 4:
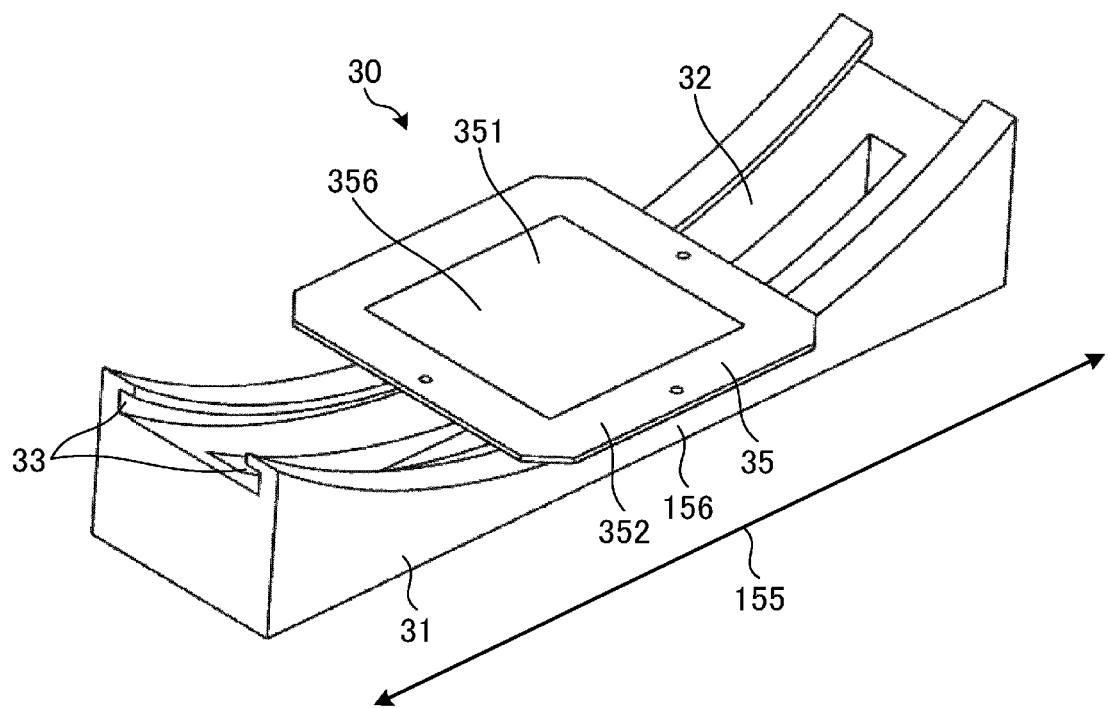
FIG. 4 is a perspective view illustrating a part of the antenna and an antenna moving mechanism.

Next, the antenna moving mechanism 30 will be described. The antenna moving mechanism 30 is a mechanism for moving the antenna 35. FIG. 4 is a perspective view illustrating a part of the antenna 35 and the antenna moving mechanism 30. The antenna moving mechanism 30 has a base portion 31 and a guide portion 32. The base portion 31 is fixed at a position below the bottom surface portion 141 of the wireless tag reading device 10 and facing the opening portion 149.

The antenna moving mechanism 30 has a guide portion 32 on the upper portion of the base portion 31. The guide portion 32 is formed in an upwardly concave arc shape (concave curve). The guide portion 32 is configured so that the vicinity of the central portion (home position 156) of the antenna moving mechanism 30 is the lowest, and the height gradually increases as the guide portion extends toward both side portions. That is, the guide portion 32 has a concave arc shape toward the product placing portion 14 direction.

Further, the rails 33 having a groove shape are respectively formed at both ends of the guide portion 32. The rail 33 has the same curve as the arc shape of the guide portion 32. The roller 354 of the antenna 35 is engaged with the guide portion 32. Therefore, the antenna 35 is guided along the guide portion 32 by the roller 354 moving along the rail 33. Since the guide portion 32 has an arc shape, the surface 356 of the antenna portion 351 moves along the guide portion 32 in a concave arcuate locus.

Also, the antenna portion 351 changes the angle (that is, the angle of the surface 356) with respect to the product placing portion 14 as it moves in the direction of an arrow 155 along the guide portion 32. Specifically, the surface 356 of the antenna portion 351 changes its angle so as to always face the product placing portion 14 direction while moving in the direction of the arrow 155.

Figure 5:
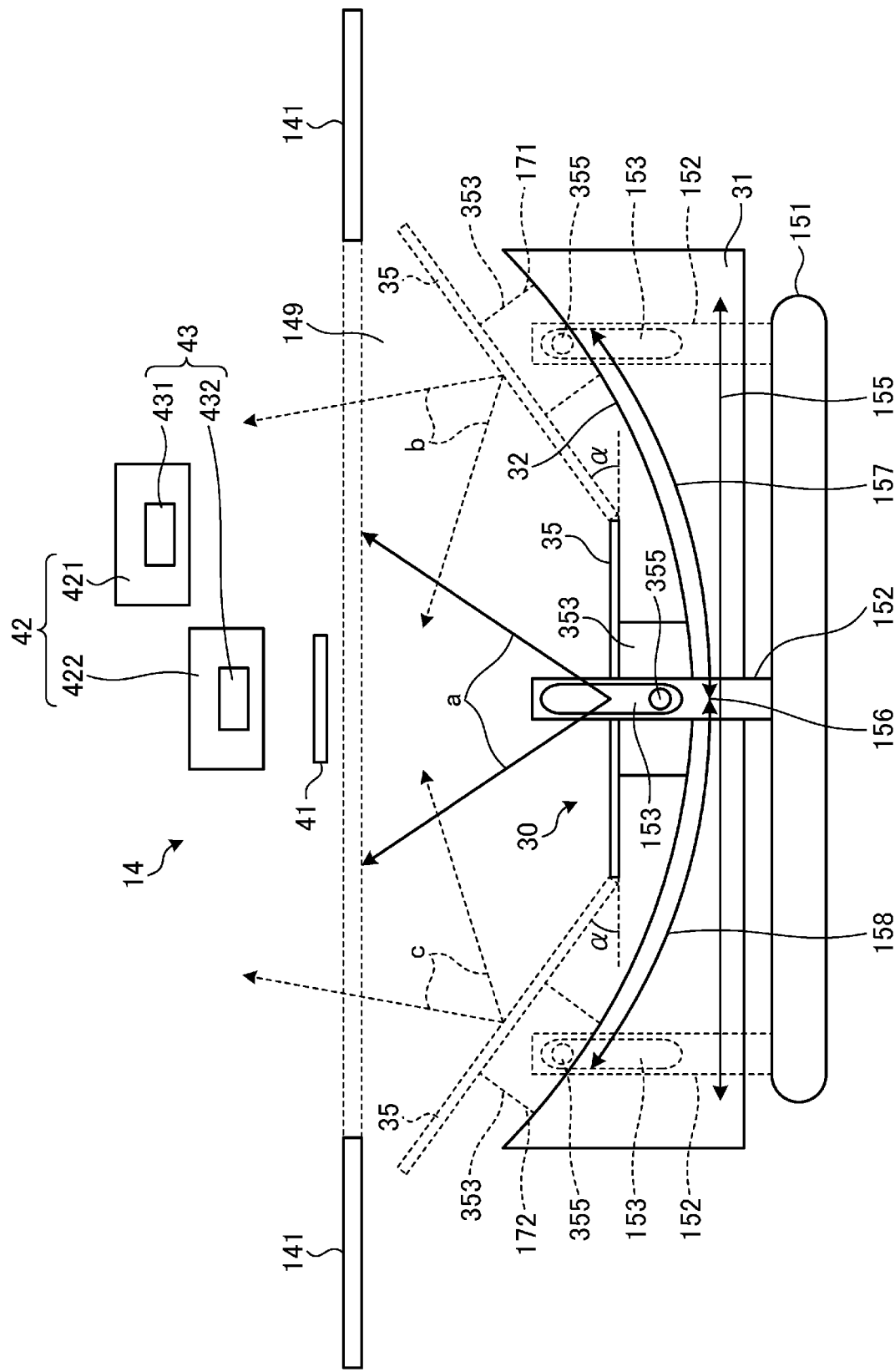
FIG. 5 is an explanatory diagram illustrating a configuration of the antenna and the antenna moving mechanism.

Next, the configuration in which the antenna moving mechanism 30 moves the antenna 35 to transmit radio waves to the wireless tag 43 will be described. FIG. 5 is an explanatory diagram illustrating the configuration of the antenna 35 and the antenna moving mechanism 30. As illustrated in FIG. 5, the wireless tag reading device 10 is provided with the antenna moving mechanism 30 at the bottom below the bottom surface portion 141. That is, the antenna moving mechanism 30 is provided under the product 42 stored in the basket 20 placed on the product placing portion 14.

The antenna moving mechanism 30 includes a belt conveyor 151 composed of an endless belt. The belt conveyor 151 is reciprocated by a motor 167 (see FIG. 6). On the upper surface of the belt conveyor 151, one guide member 152 having a rod shape is attached upright from the belt conveyor 151. As the belt conveyor 151 rotates, the guide member 152 reciprocates together with the belt conveyor 151 in the rotation direction (the direction of the arrow 155) of the belt conveyor 151.

The guide member 152 has an elongated hole 153. The elongated hole 153 is a hole in which the longitudinal direction is parallel to the standing direction (the direction substantially perpendicular to the moving direction (the direction of the arrow 155) of the guide member 152) of the guide member 152.

Further, the guide portion 32 provided in the base portion 31 is an arc-shaped guide (a guide for guiding the antenna 35) formed between a position 171 and a position 172. The central portion of the guide portion 32, which is a substantially intermediate position between the position 171 and the position 172, is the home position 156. The guide portion 32 has an arcuate locus from the position 171 through the home position 156 to the position 172. That is, the home position 156 is located at the lowest position in the base portion 31, and the positions 171 and 172 are located higher than the home position 156 in the base portion 31.

The antenna moving mechanism 30 is composed of the base portion 31, the guide portion 32, the rail 33, the elongated hole 153, the belt conveyor 151, the motor 167, and the like.

The antenna 35 has a substantially columnar guide rod 355 at the base portion 353. The guide rod 355 is inserted into the elongated hole 153. The guide rod 355 can freely move in the elongated hole 153 in the longitudinal direction of the elongated hole 153.

Since the guide rod 355 is inserted into the elongated hole 153, the guide rod 355 moves in the same direction if the guide member 152 moves. As the guide rod 355 moves, the antenna 35 moves along the guide portion 32.

If the guide member 152 is located at the home position 156, the antenna 35 is located at the home position 156. If the antenna 35 is located at the home position 156, the antenna portion 351 (that is, the surface 356) is facing straight upward. That is, the surface 356 faces the direction of the product 42.

In the product placing portion 14, a product 421 and a product 422 stored in the basket 20 exist (the product 421 and the product 422 are collectively referred to as products 42). A wireless tag 431 is attached to the product 421. A wireless tag 432 is attached to the product 422 (the wireless tag 431 and the wireless tag 432 are collectively referred to as wireless tags 43). Further, for example, a shielding object 41 made of metal exists below the product 422.

The antenna 35 emits radio waves in the direction perpendicular to the surface 356. Further, the antenna 35 emits radio waves radially from the surface 356. That is, the antenna 35 emits radio waves within the range of arrows a. The emitted radio wave reaches the wireless tag 431. Therefore, the antenna 35 (to be exact, the antenna portion 351) receives a response radio wave transmitted from the wireless tag 431. The antenna 35 can read the information of the wireless tag 431. However, due to the shielding object 41, the transmitted radio wave does not reach the wireless tag 432. Therefore, a response radio wave is not transmitted from the wireless tag 432. Therefore, the antenna 35 cannot read the information of the wireless tag 432.

If the guide member 152 moves from the home position 156 in the direction of the arrow 157, the antenna 35 moves from the home position 156 in the direction of the arrow 157 while being guided by the rail 33 and the guide portion 32. In this case, since the antenna 35 moves in the direction of the position 171 along the upwardly concave arcuate guide portion 32, the antenna portion 351 gradually tilts to the left from the direction directly above. If the antenna portion 351 is gradually tilted from the direction directly above, the surface 356 faces the direction of the wireless tag 43 attached to the product 42 stored in the basket 20 placed on the product placing portion 14.

If the guide member 152 is located at the position 171, the antenna 35 is located at the position 171. If the antenna 35 is located at the position 171, the antenna portion 351 (that is, the surface 356) becomes an inclined surface which descends from the right side to the left side in FIG. 5. In this state, the antenna portion 351 (that is, the surface 356) faces the direction of the product 42 stored in the basket 20 placed on the product placing portion 14. Also, in this state, the shielding object 41 does not exist between the antenna 35 and the wireless tag 432.

The antenna 35 emits radio waves in the direction perpendicular to the surface 356. Further, the antenna 35 emits radio waves radially from the surface 356. That is, the antenna 35 emits radio waves within the range of arrows b at the position 171. The emitted radio wave reaches the wireless tag 431. Therefore, the antenna 35 (to be exact, the antenna portion 351) receives a response radio wave transmitted from the wireless tag 431. The antenna 35 can read the information of the wireless tag 431. In addition, the transmitted radio wave reaches the wireless tag 432. Therefore, the antenna 35 (to be exact, the antenna portion 351) receives the response radio wave transmitted from the wireless tag 432. The antenna 35 can read the information of the wireless tag 432.

If the guide member 152 moves from the home position 156 in the direction of the arrow 158, the antenna 35 moves from the home position 156 in the direction of the arrow 158 while being guided by the rail 33 and the guide portion 32. In this case, since the antenna 35 moves in the direction of the position 172 along the upwardly concave arcuate guide portion 32, the antenna portion 351 gradually tilts to the right from the direction directly above. As the antenna portion 351 gradually tilts from the direction directly above, the surface 356 faces the direction of the product 42 stored in the basket 20 placed on the product placing portion 14.

If the guide member 152 is located at the position 172, the antenna 35 is located at the position 172. If the antenna 35 is located at the position 172, the antenna portion 351 (that is, the surface 356) becomes an inclined surface which descends from the left side to the right side in FIG. 5. In this state, the antenna portion 351 (that is, the surface 356) faces the direction of the product 42 stored in the basket 20 placed on the product placing portion 14. Also, in this state, the shielding object 41 does not exist between the antenna 35 and the wireless tag 432.

The antenna 35 emits radio waves in the direction perpendicular to the surface 356. Further, the antenna 35 emits radio waves radially from the surface 356. That is, the antenna 35 emits a radio wave within the range of arrows c at the position 172. The emitted radio wave reaches the wireless tag 431. Therefore, the antenna 35 (to be exact, the antenna portion 351) receives a response radio wave transmitted from the wireless tag 431. The antenna 35 can read the information of the wireless tag 431. In addition, the emitted radio wave reaches the wireless tag 432. Therefore, the antenna 35 (to be exact, the antenna portion 351) receives a response radio wave transmitted from the wireless tag 432. The antenna 35 can read the information of the wireless tag 432.

The antenna 35 is located at the home position 156 as the initial position. If the reading of the wireless tag 43 is instructed in this state, the emission of radio waves is started from the antenna 35. Further, if the reading of the wireless tag 43 is instructed, the belt conveyor 151 rotates and the antenna 35 reciprocates within the range of the arrow 155. Specifically, if the belt conveyor 151 rotates, the guide member 152 moves toward the position 171. Then, the antenna 35 moves from the home position 156 toward the position 171 in the direction of the arrow 157 while emitting radio waves. If antenna 35 reaches the position 171, the belt conveyor 151 reverses. Then, the guide member 152 moves toward the home position 156. Then, the antenna 35 moves from the position 171 toward the home position 156 in the direction of the arrow 157 while emitting radio waves.

If the antenna 35 returns to the home position 156, the guide member 152 moves toward the position 172. Then, the antenna 35 moves in the direction of the arrow 158 from the home position 156 toward the position 172 while emitting radio waves. If the antenna 35 reaches the position 172, the belt conveyor 151 rotates forward. Then, the guide member 152 moves toward the home position 156. Then, the antenna 35 moves in the direction of the arrow 157 from the position 172 toward the home position 156 while emitting radio waves.

In this way, if the antenna 35 moves from the home position 156 to the position 171 while emitting radio waves, the surface 356 of the antenna 35 gradually moves while tilting to the left, so the surface 356 faces the direction of the product 42 stored in the basket 20 placed on the product placing portion 14. Further, if the antenna 35 moves from the home position 156 to the position 172 while emitting radio waves, the surface 356 of the antenna 35 gradually moves while tilting to the right, so the surface 356 faces the direction of the product 42 stored in the basket 20 placed on the product placing portion 14.

Figure 6:
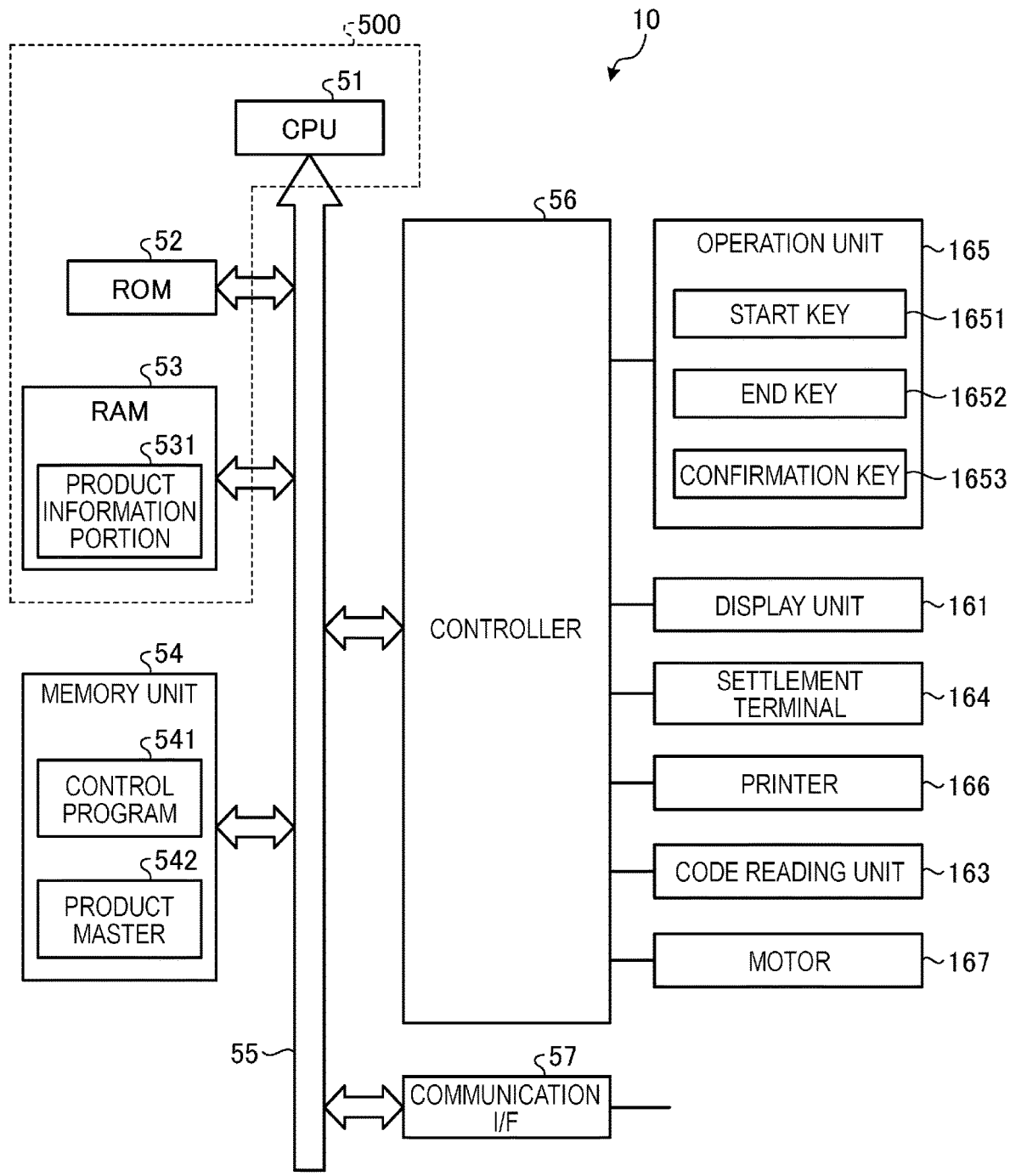
FIG. 6 is a block diagram illustrating a hardware configuration of the wireless tag reading device.

Next, the hardware configuration of the wireless tag reading device 10 will be described. FIG. 6 is a block diagram illustrating the hardware configuration of the wireless tag reading device 10. As illustrated in FIG. 6, the wireless tag reading device 10 includes a central processing unit CPU) 51, a read only memory (ROM) 52, a random access memory (RAM) 53, a memory unit 54, and the like. The CPU 51 is the main control body. The ROM 52 stores various programs. The RAM 53 loads programs and various data. The memory unit 54 stores various programs. The CPU 51, the ROM 52, the RAM 53, and the memory unit 54 are connected to each other via a bus 55. The CPU 51, the ROM 52, and the RAM 53 constitute a control unit 500. That is, the control unit 500 executes control processing of the wireless tag reading device 10, which will be described below, by operating the CPU 51 according to the control program stored in the ROM 52 or the memory unit 54 and loaded in the RAM 53.

The RAM 53 includes a product information portion 531. The product information portion 531 stores the product information (the product code, the product name, the product price, and the like) of the product 42 processed for product registration.

The memory unit 54 is composed of a non-volatile memory such as a hard disc drive (HDD) or a flash memory in which stored information is retained even if the power is turned off. The memory unit 54 stores a control program portion 541 which stores the control program for controlling the wireless tag reading device 10, and a product master 542. The product master 542 stores the product information of the product 42 in association with the product code that specifies the product 42.

Further, the control unit 500 is connected to the operation unit 165, the display unit 161, a settlement terminal 164, a printer 166, a code reading unit 163, and the motor 167 via the bus 55 and a controller 56. The controller 56 controls the operation unit 165, the display unit 161, the settlement terminal 164, the printer 166, and the code reading unit 163 in response to an instruction from the control unit 500. However, for convenience of explanation, the control unit 500 will be described as performing the control performed by the controller 56.

The operation unit 165 is a touch panel provided with a keyboard such as the start key 1651, the end key 1652, and the confirmation key 1653, and is operated by an operator of the wireless tag reading device 10. The start key 1651 is operated if starting to use the wireless tag reading device 10. The end key 1652 is operated if making a payment with the wireless tag reading device 10. The confirmation key 1653 is operated if it is confirmed that the product information of all the products 42 stored in the basket 20 is displayed in the display unit 161.

The printer 166 issues a receipt printed with the product information and the settlement information related to the settled product 42. The code reading unit 163 is a camera or an optical scanner which reads a code (for example, a two-dimensional code) displayed on a mobile terminal if making an application software payment using the mobile terminal (not illustrated). The settlement terminal 164 is a terminal operated if making a payment using, for example, a credit card or an electronic money card. The motor 167 is a motor for reciprocating the belt conveyor 151.

Further, the control unit 500 is connected to a communication unit 57 via the bus 55. The communication unit 57 is connected to a server installed in a store or another wireless tag reading device 10 (neither of them is illustrated) via a communication line (not illustrated). The communication unit 57 transmits and receives information to and from the server and other wireless tag reading device 10 via a communication line L.

Figure 7:
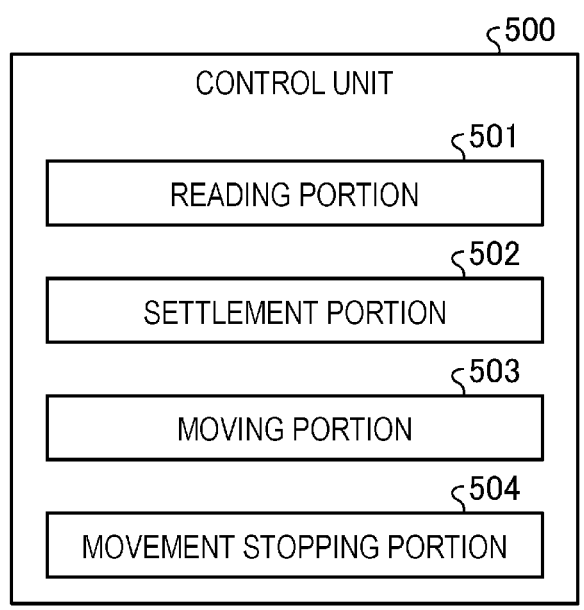
FIG. 7 is a functional block diagram illustrating a functional configuration of the wireless tag reading device.

Next, the functional configuration of the wireless tag reading device 10 will be described. FIG. 7 is a functional block diagram illustrating the functional configuration of the wireless tag reading device 10. As illustrated in FIG. 7, the control unit 500 of the wireless tag reading device 10 functions as a reading portion 501, a settlement portion 502, a moving portion 503, and a movement stopping portion 504 by following a control program stored in the ROM 52 or the control program portion 541 of the memory unit 54.

The reading portion 501 emits a radio wave that is the basis of the response wave from the wireless tag 43 from the antenna 35 while moving the antenna 35. Further, the reading portion 501 reads the information specifying the product 42 transmitted by the wireless tag 43 attached to the product 42 stored in the basket 20 placed on the product placing portion 14 as a response wave to the transmitted radio wave.

The settlement portion 502 executes the settlement processing based on the information of the product 42 read by the reading portion 501. Specifically, the settlement portion 502 executes the settlement processing for the product 42 whose product information is stored in the product information portion 531, which is processed for product registration, based on the information of the product 42 read by the reading portion 501.

The moving portion 503 drives the antenna moving mechanism 30 to move the antenna 35. Specifically, the moving portion 503 causes the antenna moving mechanism 30 to move the antenna 35 if the start key 1651 is operated.

The movement stopping portion 504 determines to stop the movement of the antenna 35 which is moving. Specifically, the movement stopping portion 504 determines whether to stop the movement of the antenna 35 which is moving. If the antenna 35 which started the movement from the home position 156 makes one round trip via the position 171 and the position 172 and returns to the home position 156, the movement stopping portion 504 determines to stop the movement of the antenna 35 and stops the movement. If it is determined that the antenna 35 that started the movement from the home position 156 is not made a round trip yet, the movement stopping portion 504 determines not to stop the movement of the antenna 35 yet and does not stop the movement. In addition, if the confirmation key 1653 is operated while the antenna 35 is moving, the movement stopping portion 504 determines to stop the movement of the antenna 35, and returns the antenna 35 to the home position 156 to stop the movement.

Figure 8:
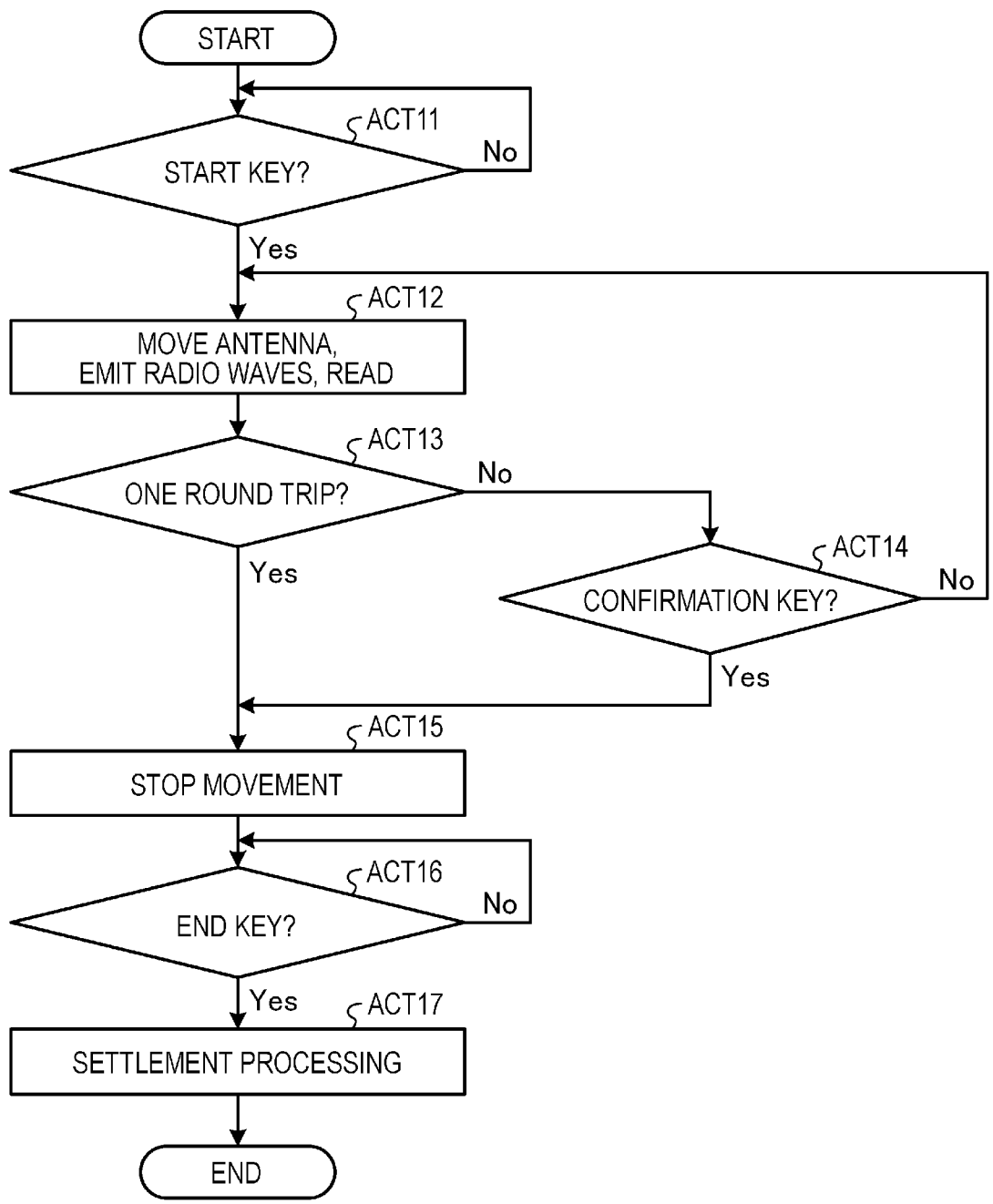
FIG. 8 is a flowchart illustrating control processing of the wireless tag reading device.

Next, the control of the wireless tag reading device 10 will be described. FIG. 8 is a flowchart illustrating control processing of the wireless tag reading device 10. As illustrated in FIG. 8, the control unit 500 of the wireless tag reading device 10 determines whether the start key 1651 corresponding to the image of the start key displayed on the display unit 161 is operated (ACT 11). Wait until the start key 1651 is operated (No in ACT 11), and if it is determined that the start key 1651 is operated (Yes in ACT 11), the moving portion 503 rotates the belt conveyor 151 and starts moving the antenna 35 from the home position 156 to the position 171 (ACT 12). Further, the reading portion 501 starts emitting radio waves to the wireless tag 43 by the antenna 35 (ACT 12). Further, the reading portion 501 starts receiving the radio wave transmitted from the wireless tag 43 by the antenna 35 (ACT 12). The reading portion 501 reads the received radio wave, reads the acquired product information (the product code that specifies the product 42, the product name, the product price, and the like) from the product master 542, and stores the information in the product information portion 531. The moving portion 503 moves the antenna 35 up to one round trip from the home position 156 to the position 171 and then from the position 171 to the position 172 and then from the position 172 to the home position 156.

Next, the movement stopping portion 504 determines whether the antenna 35 moves one round trip (ACT 13). If it is determined that one round trip is not made (No in ACT 13), the movement stopping portion 504 determines whether the confirmation key 1653 is operated (ACT 14). If it is determined that the antenna 35 moves one round trip (Yes in ACT 13), or if it is determined that the confirmation key 1653 is operated (Yes in ACT 14), the movement stopping portion 504 stops the rotation of the belt conveyor 151 and stops the movement of the antenna 35 (ACT 15).

Next, the control unit 500 determines whether the end key 1652 is operated (ACT 16). Wait until the end key 1652 is operated (No in ACT 16), and if it is determined that the end key 1652 is operated (Yes in ACT 16), the settlement portion 502 executes the settlement processing based on the product information stored in the product information portion 531 (ACT 17). Then, the control unit 500 ends the process and returns to ACT 11.

If it is determined in ACT 14 that the confirmation key 1653 is not operated (No in ACT 14), the control unit 500 returns to ACT 12 and continues to move the antenna 35, emit radio waves from the antenna 35, and receive radio waves from the wireless tag 43.

The wireless tag reading device 10 of such an embodiment includes the product placing portion 14 to place the product 42, the antenna 35 which is installed in the vicinity of the product placing portion 14 and emits radio waves toward the wireless tag 43 attached to the placed product 42, and the antenna moving mechanism 30 which moves the antenna 35 in a concave curve line with respect to the wireless tag 43 while changing the angle so that the surface 356 of the antenna 35 that emits radio waves faces the direction of the wireless tag 43 attached to the product 42 placed in the product placing portion 14.

In such a wireless tag reading device 10, the antenna 35 moves and emits radio waves from the surface 356 to the wireless tag 43, and the surface 356 always faces the direction of the wireless tag 43. Therefore, the radio wave emitted from the antenna 35 can easily reach the wireless tag 43.

Although the embodiment and modification examples are described above, this embodiment is presented as an example and is not intended to limit the scope of the invention. This novel embodiment can be implemented in various other embodiments, and various omissions, replacements, and changes can be made without departing from the gist of the invention. This embodiment or modification is included in the scope and gist of the invention, and is also included in the scope of the invention described in the claims and the equivalent scope thereof.

For example, in the embodiment, the basket 20 storing the product 42 is placed on the product placing portion 14. However, the exemplary embodiment is not limited to this, and the product 42 may be placed directly on the product placing portion 14. That is, the basket 20 is not essential.

Also, in the embodiment, by moving the antenna 35 to change the angle of the surface 356 so that the surface 356 always faces the direction of the wireless tag 43, the radio waves emitted from the antenna 35 can easily reach the wireless tag 43 even if the shielding object 41 intervenes. However, not limited to this, even if the shielding object 41 does not intervene, the radio wave emitted from the antenna 35 can easily reach the wireless tag 43.

Also, in the embodiment, the antenna moving mechanism 30 is placed below the bottom surface portion 141 of the product placing portion 14. However, the exemplary embodiment is not limited to this, and the antenna moving mechanism 30 may be provided on the side surface portion of, for example, the product placing portion 14.

Further, in the embodiment, the antenna 35 is moved between the position 171 and the position 172 with the home position 156 as the center. However, the exemplary embodiment is not limited to this, and for example, the antenna 35 may be moved so as to go around the wireless tag 43.

Further, in the embodiment, the antenna 35 is moved between the position 171 and the position 172 in an arcuate orbit around the home position 156. However, not limited to this, the point is that while the antenna 35 moves from the home position 156 to the position 171, while moving from the position 171 to the position 172, and while moving from the position 172 to the home position 156, the antenna 35 may be moved so that the surface 356 changes its angle so as to be it always face the direction of the wireless tag 43. For example, the antenna 35 may be moved along a locus of an elliptical shape (elliptical arc). Also, if the antenna 35 is moved along the locus of the ellipse, at the beginning of the movement from the home position 156 to the position 171, the angle of the antenna 35 does not change much, and as it approaches the position 171, the angle of the antenna 35 sharply changes. The same applies to the case if the antenna 35 moves from the home position 156 to the position 172.

Further, in the embodiment, the POS terminal that performs product registration processing and settlement processing is described as the wireless tag reading device 10. However, the exemplary embodiment is not limited to this, and the wireless tag reading device 10 may be a device having no function of performing product registration processing or settlement processing.

The program executed by the wireless tag reading device 10 of the embodiment is provided by being recorded in a computer-readable recording medium such as a CD-ROM, a flexible disk (FD), a CD-R, a digital versatile disk (DVD) in an installable format or executable format file.

Further, the program executed by the wireless tag reading device 10 of the embodiment may be stored on a computer connected to a network such as the Internet and provided by downloading via the network. Further, the program executed by the wireless tag reading device 10 of the embodiment may be configured to be provided or distributed via a network such as the Internet.

Further, the programs executed by the wireless tag reading device 10 of the embodiment may be configured to be provided by incorporating the programs into a ROM or the like in advance.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless tag reading device, comprising:
a product placing portion on which a product is placed;
an antenna installed in a vicinity of the product placing portion,
wherein the antenna emits radio waves toward a wireless tag attached to the placed product;
an antenna moving mechanism that moves the antenna along a locus of a concave curve defined by a guide portion of the antenna moving mechanism; and
a conveying mechanism that moves the guide portion along a linear path concurrently with the moving of the antenna along the locus of the concave curve of the guide portion by the antenna moving mechanism.

2. The wireless tag reading device according to claim 1, wherein the concave curve is an arc and the antenna moving mechanism moves a surface of the antenna with respect to the wireless tag in a concave arcuate locus with the movement of the antenna within a movable range of the antenna.

3. The wireless tag reading device according to claim 1, wherein the concave curve is an elliptical arc and the antenna moving mechanism causes an angle of a surface of the antenna to change more sharply with respect to the wireless tag due to the movement of the antenna in vicinities of both ends in a movable range of the antenna than in a vicinity of a central portion of the movable range.

4. The wireless tag reading device according to claim 1, wherein the antenna and the antenna moving mechanism are provided below the product placing portion.

5. The wireless tag reading device according to claim 1, further comprising a controller which drives the antenna moving mechanism if a movement instruction signal for the antenna is output.

6. The wireless tag reading device according to claim 1, wherein the antenna installed in the vicinity of the product placing portion is at a distance so that radio waves emitted toward the wireless tag are received by the wireless tag.

7. The wireless tag reading device according to claim 1, wherein the product placing portion is a table on which a basket is placed.

8. A wireless tag reading method, comprising:
placing a product on a product placing portion of a wireless tag reading device;
emitting radio waves from an antenna installed in a vicinity of the product placing portion toward a wireless tag attached to the placed product;
moving the antenna along a locus of a concave curve of a guide portion using an antenna moving mechanism; and
moving the guide portion along a linear path concurrently with the moving of the antenna along the locus of the concave curve of the guide portion.

9. The wireless tag reading method according to claim 8, wherein the concave curve is an arc, further comprising:
moving a surface of the antenna with respect to the wireless tag in a concave arcuate locus with the movement of the antenna within a movable range of the antenna.

10. The wireless tag reading method according to claim 8, wherein the concave curve is an elliptical arc, further comprising:
causing an angle of a surface of the antenna to change more sharply with respect to the wireless tag due to the movement of the antenna in vicinities of both ends in a movable range of the antenna than in a vicinity of a central portion of the movable range.

11. The wireless tag reading method according to claim 8, wherein the antenna and the antenna moving mechanism are provided below the product placing portion.

12. The wireless tag reading method according to claim 8, further comprising:
driving the antenna moving mechanism if a movement instruction signal for the antenna is output.

13. The wireless tag reading method according to claim 8, further comprising:
placing a basket comprising the wireless tag on a table of the product placing portion.

14. A POS Terminal, comprising:
a product registration component;
a product settlement component; and
a wireless tag reading device, comprising:
a product placing portion on which a product is placed;
an antenna installed in a vicinity of the product placing portion and emits radio waves toward a wireless tag attached to the placed product;
an antenna moving mechanism that moves the antenna along a locus of a concave curve of a guide portion; and
a conveying mechanism that moves the guide portion along a linear path concurrently with the moving of the antenna along the locus of the concave curve of the guide portion.

15. The wireless tag reading device according to claim 14, wherein the concave curve is an arc and the antenna moving mechanism moves a surface of the antenna with respect to the wireless tag in a concave arcuate locus with the movement of the antenna within a movable range of the antenna.

16. The wireless tag reading device according to claim 14, wherein the concave curve is an elliptical arc and the antenna moving mechanism causes an angle of a surface of the antenna to change more sharply with respect to the wireless tag due to the movement of the antenna in vicinities of both ends in a movable range of the antenna than in a vicinity of a central portion of the movable range.

17. The wireless tag reading device according to claim 14, wherein the antenna and the antenna moving mechanism are provided below the product placing portion.

18. The wireless tag reading device according to claim 14, further comprising a controller which drives the antenna moving mechanism if a movement instruction signal for the antenna is output.

19. The wireless tag reading device according to claim 14, wherein the antenna installed in the vicinity of the product placing portion is at a distance so that radio waves emitted toward the wireless tag are received by the wireless tag.

20. The wireless tag reading device according to claim 14, wherein the product placing portion is a table on which a basket is placed.

\* \* \* \* \*